United States Patent
Soe et al.

(10) Patent No.: US 10,877,766 B2
(45) Date of Patent: Dec. 29, 2020

(54) EMBEDDED SCHEDULING OF HARDWARE RESOURCES FOR HARDWARE ACCELERATION

(71) Applicant: Xilinx, Inc., San Jose, CA (US)

(72) Inventors: Soren T. Soe, San Jose, CA (US); Idris I. Tarwala, Tracy, CA (US); Umang Parekh, San Jose, CA (US); Sonal Santan, San Jose, CA (US); Hem C. Neema, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 126 days.

(21) Appl. No.: 15/988,900

(22) Filed: May 24, 2018

(65) Prior Publication Data
US 2019/0361708 A1   Nov. 28, 2019

(51) Int. Cl.
*G06F 9/38* (2018.01)
*G06F 9/30* (2018.01)

(52) U.S. Cl.
CPC ........ *G06F 9/3855* (2013.01); *G06F 9/30101* (2013.01)

(58) Field of Classification Search
CPC .......... G06F 9/544; G06F 9/545; G06F 9/546; G06F 9/50; G06F 9/4806; G06F 9/4881; G06F 9/4887; G06F 9/4893; G06F 9/3877
USPC .......................................................... 712/34
See application file for complete search history.

(56) References Cited

U.S. PATENT DOCUMENTS

| 4,245,306 A | 1/1981 | Besemer |
| 6,360,243 B1 * | 3/2002 | Lindsley ............... G06F 9/4812 712/22 |
| 6,477,598 B1 | 11/2002 | Yu |
| 7,328,277 B2 | 2/2008 | Hussey et al. |
| 7,428,603 B2 | 9/2008 | Henson |

(Continued)

FOREIGN PATENT DOCUMENTS

WO   2012131523 A1   10/2012

OTHER PUBLICATIONS

Hussain, T et al. PPMC: Hardware scheduling and memory management support for multi accelerators. 22nd Intl. Conf. on FPL, Aug. 2012, pp. 571-574 [online], [retrieved on Nov. 27, 2019]. Retrieved from the Internet <URL: https://ieeexplore.ieee.org/document/6339373 > <DOI: 10.1109/FPL.2012.6339373 >.*

(Continued)

*Primary Examiner* — Aimee Li
*Assistant Examiner* — Shawn Doman
(74) *Attorney, Agent, or Firm* — Kevin T. Cuenot

(57) ABSTRACT

An integrated circuit (IC) may include a scheduler for hardware acceleration. The scheduler may include a command queue having a plurality of slots and configured to store commands offloaded from a host processor for execution by compute units of the IC. The scheduler may include a status register having bit locations corresponding to the slots of the command queue. The scheduler may also include a controller coupled to the command queue and the status register. The controller may be configured to schedule the compute units of the IC to execute the commands stored in the slots of the command queue and update the bit locations of the status register to indicate which commands from the command queue are finished executing.

16 Claims, 6 Drawing Sheets

(56) References Cited

U.S. PATENT DOCUMENTS

| | | | |
|---|---|---|---|
| 7,669,037 B1* | 2/2010 | Schumacher | G06F 9/5044 712/34 |
| 7,673,087 B1* | 3/2010 | Ansari | G06F 13/366 370/911 |
| 7,737,725 B1* | 6/2010 | Ansari | G06F 15/7867 326/41 |
| 7,743,176 B1* | 6/2010 | Turney | G06F 13/28 709/212 |
| 7,934,113 B2 | 4/2011 | Chard | |
| 8,315,634 B2 | 11/2012 | Gustavsson | |
| 9,405,550 B2 | 8/2016 | Biran | |
| 9,547,535 B1 | 1/2017 | Wilt | |
| 2004/0028141 A1* | 2/2004 | Hsiun | H04N 9/641 375/240.25 |
| 2007/0283358 A1* | 12/2007 | Kasahara | G06F 9/5044 718/104 |
| 2009/0217275 A1* | 8/2009 | Krishnamurthy | G06F 9/5077 718/102 |
| 2010/0146256 A1 | 6/2010 | Luo | |
| 2010/0325638 A1 | 12/2010 | Nishimaki | |
| 2011/0131430 A1* | 6/2011 | Krishnamurthy | G06F 1/3203 713/320 |
| 2012/0054771 A1* | 3/2012 | Krishnamurthy | G06F 9/4881 718/105 |
| 2013/0031553 A1* | 1/2013 | Hou | G06F 9/4843 718/100 |
| 2013/0117533 A1* | 5/2013 | Hayek | G06F 9/3851 712/30 |
| 2014/0344815 A1* | 11/2014 | Ginzburg | G06F 9/30036 718/101 |
| 2015/0135182 A1* | 5/2015 | Liland | G06F 9/3867 718/102 |
| 2015/0234679 A1 | 8/2015 | Moyer | |
| 2015/0293775 A1* | 10/2015 | Persson | G06F 9/45558 718/1 |
| 2016/0011907 A1* | 1/2016 | Moyer | G06F 9/4843 718/104 |
| 2016/0026908 A1 | 1/2016 | Van Der Merwe | |
| 2016/0055106 A1* | 2/2016 | Ansari | G06F 9/4812 710/266 |
| 2016/0098365 A1* | 4/2016 | Bshara | G06F 13/105 710/104 |
| 2016/0132441 A1* | 5/2016 | Styles | G06F 13/28 710/110 |
| 2016/0335215 A1* | 11/2016 | Biran | G06F 9/3877 |
| 2018/0308197 A1 | 10/2018 | Vembu | |
| 2019/0026157 A1* | 1/2019 | Suzuki | G06F 9/3877 |
| 2019/0347125 A1* | 11/2019 | Sankaran | G06F 9/3004 |

OTHER PUBLICATIONS

Soe, S., et al., "Programming and Controlling Compute Units in an Integrated Circuit", U.S. Appl. No. 16/194,911, filed Nov. 19, 2018, 46 pages, Xilinx, Inc., San Jose, CA.

WIPO Appln. PCT/US2019/031443, Invitation to Pay Add'l. Fees, Communication Relating to the Results of the Partial Int'l. Search, and Provisional Opinion Accompanying the Partial Search Result, Jul. 3, 2019, 11 pages.

* cited by examiner

EMBEDDED SCHEDULING OF HARDWARE RESOURCES FOR HARDWARE ACCELERATION

TECHNICAL FIELD

This disclosure relates to integrated circuits (ICs) and, more particularly, to embedded scheduling of hardware resources to facilitate hardware acceleration.

BACKGROUND

A heterogeneous computing platform (HCP) refers to a type of data processing system that includes a host processor and one or more other different processing devices. The host processor is typically implemented as a central processing unit (CPU). The host processor is coupled to the other processing devices through interface circuitry. The other processing devices are architecturally different from the host processor. Still, the processing devices are capable of performing operations offloaded from the host processor and making results of the operations available to the host processor.

Within some HCPs, the processing devices are adapted to execute program code. Such processing devices typically have an instruction set architecture that differs from the host. Examples of these other processors include, but are not limited to, graphics processing unit(s) (GPUs), digital signal processor(s) (DSPs), and so forth.

In other HCPs, the processing devices that perform operations offloaded from the host processor include devices adapted to hardware accelerate program code. These processing devices include circuitry that implements the offloaded operation. The circuitry is functionally equivalent to program code that, when executed by a processor (e.g., a CPU), is capable of performing the offloaded operation. Examples of processing devices capable of hardware acceleration include programmable integrated circuits (ICs) such as field programmable gate arrays (FPGAs), partially programmable ICs, application specific ICs (ASICs), and so forth. Appreciably, an HCP may include a combination of processing devices where one or more are adapted to execute program code and one or more others are adapted to hardware accelerate program code.

The host processor is charged with offloading operations to the processing devices and retrieving results from the processing devices. The ability of the host processor to efficiently move the necessary data to and from the processing devices can significantly affect the overall efficiency and performance of the HCP.

SUMMARY

One or more embodiments are directed to an integrated circuit (IC) that includes a scheduler for hardware acceleration. The scheduler may include a command queue having a plurality of slots and configured to store commands offloaded from a host processor for execution by compute units of the IC. The scheduler may include a status register having bit locations corresponding to the slots of the command queue. The scheduler may also include a controller coupled to the command queue and the status register. The controller may be configured to schedule the compute units of the IC to execute the commands stored in the slots of the command queue and update the bit locations of the status register to indicate which commands from the command queue are finished executing.

One or more embodiments are directed to a method of scheduling commands for hardware acceleration using an IC. The method may include storing a command, received from a host processor, within a slot of a command queue within the IC, wherein the command is offloaded from the host processor for execution by a compute unit of the IC. The method may include scheduling, using a controller, the compute unit to execute the command stored in the slot of the command queue. The method may include, in response to determining that the command is finished executing, writing a bit location in a status register within the IC, wherein the bit location corresponds to the slot of the command queue storing the command.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
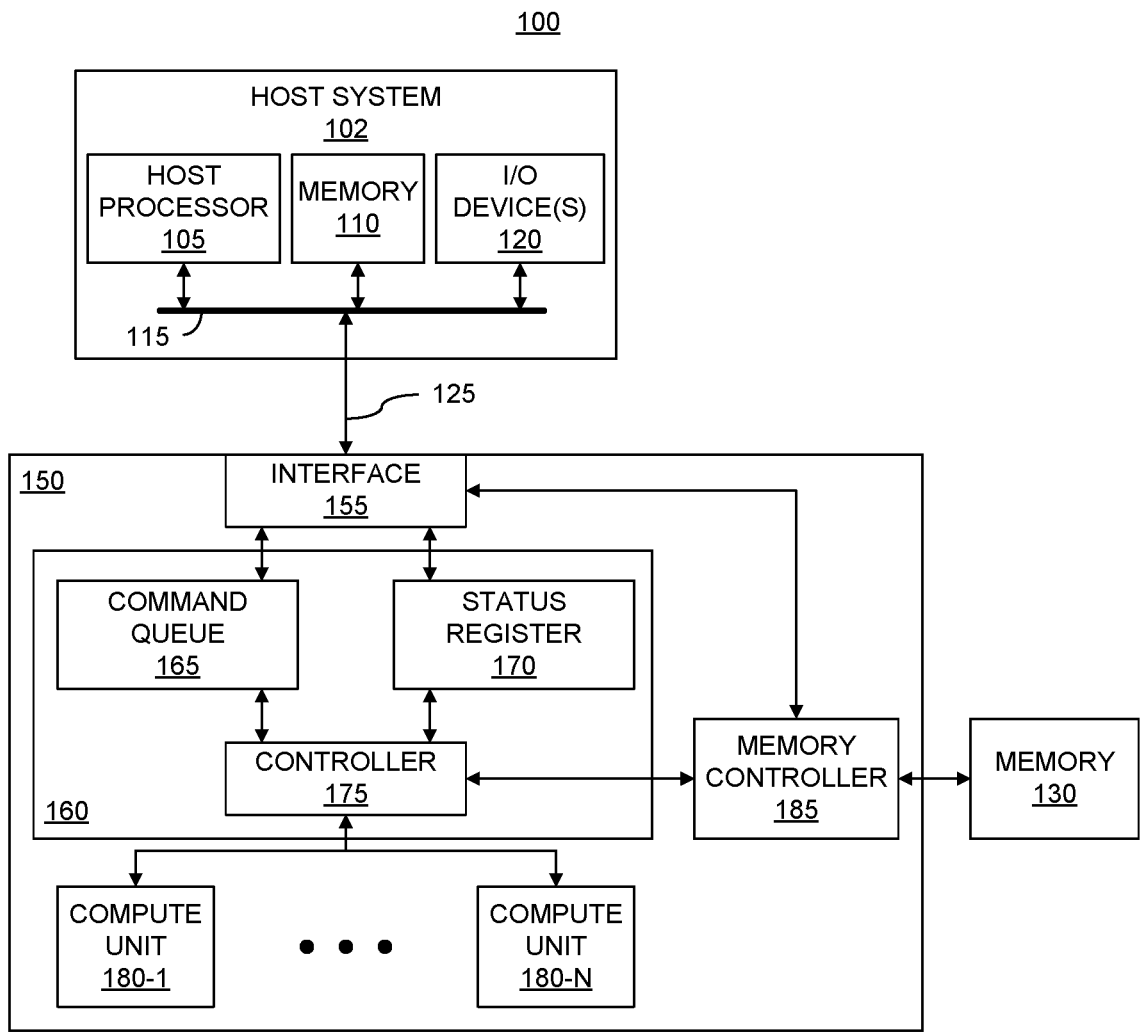
FIG. 1 illustrates an example of a heterogeneous computing platform for use with one or more embodiments described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to embedded scheduling of hardware resources to facilitate hardware acceleration. In accordance with the inventive arrangements described within this disclosure, a hardware scheduler is embedded within an IC used for hardware acceleration. The hardware scheduler assists with the offloading of operations from a host processor of a heterogeneous computing platform (HCP) to the hardware resources within the IC. Within this disclosure, the hardware resources are referred to as "compute units." The hardware scheduler is capable of managing and tracking operation of the compute units.

In conventional HCPs, scheduling is implemented as a software process executed by the host processor. The host processor is tasked with continually polling the individual compute units of the IC to determine when a compute unit is available for performing an operation. The polling of compute units consumes a significant amount of host processor time. Further, since the scheduler executes in the host processor, the host processor must wait until compute units are available before sending a command to the IC. The host processor sends a command only in response to determining that a compute unit is available for executing the command. As such, a delay is incurred between the time the compute unit becomes available and the time that the compute unit is able to begin execution on the command. This delay includes the time necessary to transfer the command, including data needed by the compute unit, from the host processor to the IC including the compute unit.

In accordance with the inventive arrangements described herein, the hardware scheduler is implemented in the same IC that includes the compute units (e.g., the hardware resources that perform the actual operations offloaded from the host processor). The hardware scheduler is capable of tracking the availability of the compute units within the IC. The hardware scheduler is also capable of receiving commands (e.g., operations) sent from the host processor. The hardware scheduler is capable of storing the commands in a command queue until such time that a compute unit becomes available to execute the command(s). As such, the host processor is capable of sending commands and continuing with other tasks without having to continually poll for an available compute unit and/or wait for a compute unit to become available before sending the command to the IC.

Once the command is queued within the hardware scheduler and a compute unit becomes available, transfer of the command to the compute unit requires no host processor involvement. The hardware scheduler transfers the command to the compute unit. Since the hardware scheduler and the compute unit are in the same IC, the time for transferring the command to the compute unit is relatively small. As such, the delay between the time that compute unit becomes available and the time that compute unit begins execution of the command is reduced.

The hardware scheduler is further capable of determining when commands are finished executing. In response to determining that a command has finished executing, the hardware scheduler is capable of notifying the host processor. For example, the hardware scheduler is capable of writing to a status register included within the hardware scheduler itself in response to determining that a command has finished execution. The status register may be read by the host processor to ascertain that the status of commands and the particular commands that have finished execution. Use of the status register allows the host processor to operate at the "command" level as opposed to managing each of the compute units of the IC individually.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a heterogeneous computing platform (HCP) 100. In the example FIG. 1, HCP 100 includes a host system 102 and an IC 150 used as a hardware acceleration device.

Host system 102 may be implemented as a data processing system such as a computer or a server. Host system 102 includes a host processor 105 coupled to memory 110, and one or more input/output (I/O) devices through interface circuitry 115. Host system 102 is capable of storing computer readable instructions (program code) within memory 110. Memory 110 is an example of computer readable storage media. Host processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random-access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. Host system 102 may also include one or more cache memories (not shown) that provide temporary storage of at least some program code in order to reduce the number of times program code must be retrieved from a bulk storage device during execution.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

I/O devices 120 may be coupled to host system 102, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables host system 102 to become coupled to other systems, computer systems, remote printers, and/or remote storage devices through intervening private or public networks. Modems, cable modems, Ethernet cards, and wireless transceivers are examples of different types of network adapters that may be used with host system 102.

In one or more embodiments, memory 110 stores an operating system (not shown) and one or more applications (not shown) that may be executed by host processor 105. A runtime library may also be executed by host processor 102. In one or more embodiments, the runtime library may be linked or otherwise incorporated with the application(s) executed by host processor 105. The runtime library includes the functions used to communicate with IC 150.

Host system 102 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. Host system 102 may be used to implement a single computer or a plurality of networked or interconnected computers each implemented using the architecture of FIG. 1 or an architecture similar thereto.

IC 150 is communicatively linked to host system 102 via a communication link 125. For example, IC 150 may be coupled to a circuit board that may be included within host system 102. In one or more embodiments, communication link 125 is a PCIe link. It should be appreciated, however, that communication link 125 may be implemented using any of a variety of different connections and/or communication protocols and that the examples provided are not intended as limitations.

IC 150 includes an interface 155 that is capable of communicating over communication link 125 with host system 102. In particular embodiments, interface 155 is a PCIe interface that includes a direct memory access (DMA) circuit. The DMA portion of interface 155 is capable of reading and/or writing to one or more memories such as command queue 165, status register 170, and/or memory 130 via memory controller 185 thereby allowing host system 102 to read and/or write to such memories.

Scheduler 160 further may include command queue 165, status register 170, and a controller 175. Though shown separately, in one or more other embodiments, interface 155 may be considered a part of scheduler 160.

Command queue 165 may be implemented as a memory. For example, command queue 165 may be implemented as a random-access memory (RAM). In one or more embodiments, command queue 165 is implemented as one or more Block RAMs (BRAMs) within IC 150. Command queue 165 may be written to by host processor 105 (e.g., in executing the runtime library) and read by controller 175. Command queue 165 may be partitioned into a plurality of regions of fixed size referred to as "slots." Each slot is capable of storing a command (e.g., one command) from host processor 105.

In particular embodiments, each slot is the same size. In one aspect, the size of the slots may configured at compile time of the circuit design including scheduler 160 since the size of the largest command to be handled by scheduler 160 is known. The slots may be sized to store the largest command handled by scheduler 160. In one or more other embodiments, the size of the slots may be configured by the runtime library executed by host processor 105. In any case, host processor 105 is capable of writing new commands into available slots of command queue 165.

Status register 170 may be implemented as a memory. Status register 170 may be sized to include a number of bits that is greater than or equal to the number of slots contained in command queue 165. As such, each bit position of status register 170 may correspond to a slot of command queue 165. The bit position in the status register indicates whether the command stored in the corresponding slot has finished execution. A "1" written to bit position "X" in status register 170, for example, indicates that the command stored in slot "X" of command queue 165 has completed execution. Host processor 105, by execution of the runtime library, is capable of reading bits in command queue 165 to determine whether any and/or which commands from command queue 165 have finished executing.

Controller 175 is capable of tracking the status of slots (and the commands stored therein) within command queue 165, tracking the status of compute units 180, and writing to status register 170 to indicate that commands from command queue 165 have finished execution. In one or more embodiments, controller 175 is implemented as a processor that is embedded in IC 150 and is capable of executing program code. In particular embodiments, the processor is hardwired. In other embodiments, the processor is a "soft-processor" implemented using programmable circuitry of IC 150. Controller 175 may execute firmware that causes controller 175 to perform the various operations described herein.

Compute units 180 are used for hardware acceleration. Compute units 180 may be used to perform operations offloaded from host system 102 and, more particularly, from host processor 105. In the example of FIG. 1, compute units 180 are coupled to controller 175. Controller 175 is capable of reading commands from command queue 165 and providing the commands to available ones of compute units 180. In one or more embodiments, controller 175 is capable of polling compute units 180 to determine whether each respective compute unit 180 is busy or idle. In one or more other embodiments, compute units 180 are capable of generating interrupts to controller 175 to indicate that the compute unit has finished executing a command.

In one or more embodiments, controller 175 is coupled to compute units 180 through an on-chip interconnect (not shown). Interface 155 may also be coupled to command queue 165 and to status register 170 via an on-chip interconnect (not shown). An example of an on-chip interconnect is an Advanced Microcontroller Bus Architecture (AMBA) eXtensible Interface (AXI) bus. An AMBA AXI bus is an embedded microcontroller bus interface for use in establishing on-chip connections between circuit blocks and/or systems. AXI is provided as an illustrative example of an interface and is not intended as a limitation of the embodiments described within this disclosure. Other examples of interfaces used to couple controller 175 and compute units 180 may include, but are not limited to, other types of buses, a network-on-chip (NoC), a cross-bar, or other type of switch.

Memory 130 may be included as an off-chip memory that may be accessed (e.g., read and/or written) by compute units 180 and/or controller 175 via memory controller 185. In one or more embodiments, host processor 105 may also access (e.g., read and/or write) memory 130 via memory controller 185. Memory 130 may be coupled to the circuit board on which IC 150 is coupled. Thus, in particular embodiments, compute units 180 may store results of executed commands in memory 130. Host processor 105 may then retrieve the results from memory 130.

For purposes of description and ease of illustration, "Open Computing Language" or "OpenCL™" terminology is used throughout this application. It should be appreciated that any of a variety of different frameworks and/or languages supporting HCPs may be used. As such, the inventive arrangements are not intended to be limited to OpenCL. Rather, the embodiments described within this disclosure may be used with any of a variety of suitable and different HCP frameworks. Examples of other HCP and/or hardware acceleration frameworks that may be used with the embodiments described within this disclosure include, but are not limited to, Open Multi-Processing (OpenMP®) and CUDA®.

Figure 2:
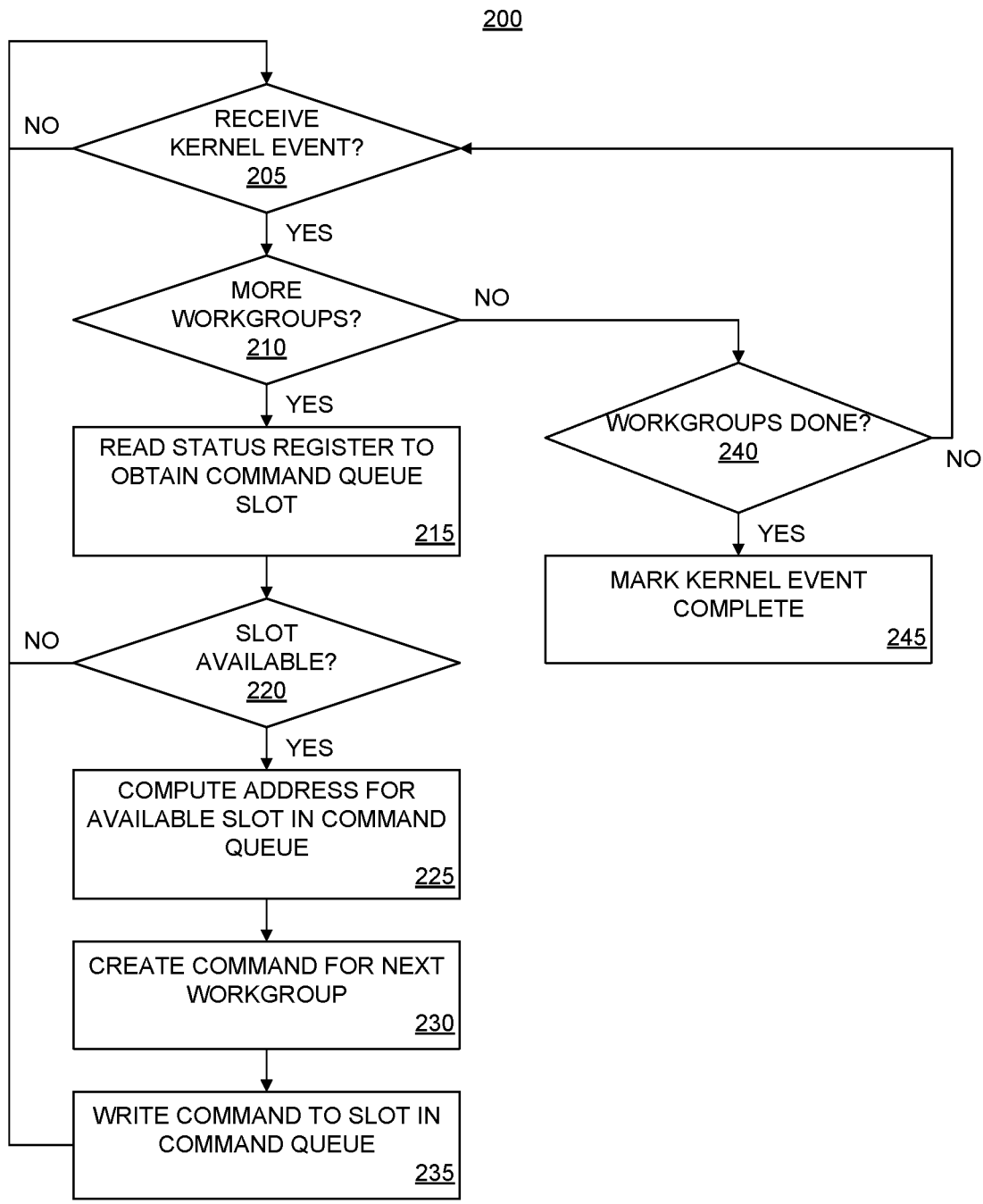
FIG. 2 illustrates an example method of offloading a command from a host processor.

FIG. 2 illustrates an example method 200 of offloading a command as performed by host processor 105 of HCP 100 described in connection with FIG. 1. Method 200 may begin in a state where HCP 100 is operating. Host processor 105 is capable of performing the operations described with reference to FIG. 2 through, at least in part, execution of the runtime library that provides functions for communicating with IC 150 and scheduler 160 contained therein. In one or more embodiments, host processor 105, in executing the runtime library, executes a dedicated command thread. Host processor 105, in executing the command thread, is capable of performing the operations described in FIG. 2.

In block 205, the host processor is capable determining whether a kernel event has been received. A kernel event may be received from an application executed by the host processor and requests offloading of a function to a hardware accelerator. If a kernel event is received, method 200 continues to block 210. If a kernel event is not received, method 200 continues to loop through block 205 awaiting the occurrence of a kernel event.

For example, the host processor is capable of writing a command to the command queue of the scheduler for each work group associated with a kernel invocation. Separate kernel invocations (e.g., kernel events) are capable of running in parallel. The host processor is capable of checking each kernel event to determine whether there are more workgroups to be executed or if all workgroups have been scheduled for that particular kernel event.

In block 210, the host processor is capable of determining whether there are any more workgroups to be scheduled for the kernel event. The host processor, for example, is capable of partitioning a function to be performed, as represented by the kernel event, into one or more workgroups. If one or more workgroups remain to be processed, method 200 continues to block 215. If no further workgroups remain to be processed, method 200 proceeds to block 240.

In general, the host processor is capable of scheduling functions immediately when such functions are ready to be executed per the host processor application being executed. As discussed, the host processor need not perform any polling to check whether compute units are ready. Similarly, the host processor is not responsible for starting computing units.

In block 215, the host processor is capable of reading the status register of the scheduler to obtain a slot in the command queue. As noted, each bit in the status register corresponds to a slot in the command queue. Accordingly, any bit positions of the status register that have a value of "1" when read indicate that the command stored in the slot of the command queue corresponding to the bit position has completed execution. As such, that slot is free or available for receiving a new command from the host processor.

In block 220, the host processor determines whether a slot in the command queue is available. For example, if the host processor reads one or more "1" values from the status register, then a number of slots within the command queue equal to the number of "1" values read from the status register are available. Further, the host processor knows which slots of the command queue are available based upon the bit positions of the "1" values read. If a slot in the command queue is available, method 200 continues to block 225. If the host processor, after reading the status register, determines that no slots in the command queue are available (e.g., the status register contains all "0" values), method 200 may loop back to block 205 to continue processing. The host processor may continue to loop and attempt to obtain a slot within the command queue to process the received event. In particular embodiments, the command queue may include more slots than compute units. In this regard, the availability of a compute unit is not determinative as to whether the command queue has room (e.g., free slots) to store further commands.

In one or more embodiments, the status register is implemented to clear-on-read. As such, the scheduler is able to write to the status register multiple times without the host processor reading the status register. In response to the status register being read, e.g., by the host processor, the status register is configured to clear the contents stored therein automatically.

In block 225, the host processor is capable of computing an address for a free slot within the command queue. For example, after reading the status register, the host processor knows which slots in the command queue are available. Since each slot has a fixed size, the host processor is capable of computing an address for an available slot in the command queue for storing a command. In one or more embodiments, the host processor is capable of choosing the first available slot in the command queue for storing the command. In that case, the host processor computes an address for the first available slot in the command queue.

In block 230, the host processor is capable of creating a command for the next workgroup. The command may include a header and one or more arguments. The header of the command may include an opcode indicating a type of command and a bit mask specifying which of the compute units of the IC may be used to execute the command. The arguments of the command may be included in a portion of the command referred to as the register map. The arguments of the command are the data processed by the compute unit(s) in executing the command. Different types of commands may include different numbers of arguments of varying size.

In one or more embodiments, the host processor includes one workgroup within each command. In one or more other embodiments, the host processor is capable of including more than one workgroup in a command.

As an illustrative and non-limiting example, one type of command is the START_KERNEL command. The START_KERNEL command has a unique opcode indicating the type of command. In response to each kernel event, the host processor is capable of generating a START_KERNEL command for each workgroup of the kernel event. As noted, in other embodiments, the START_KERNEL command may include more than one workgroup. The START_KERNEL command includes an opcode, a compute unit bit mask indicating which compute units may be used to execute the command, and a register map portion including the arguments. The arguments include the data necessary to start the compute units for the given command.

It should be appreciated that other commands (e.g., opcodes) may be used other than the START_KERNEL command. Such other commands may be for a variety of different purposes supported by the scheduler. For example, the host processor may generate commands for the scheduler to execute that implement debugging of compute unit execution progress, that retrieve information about hardware resources within the IC, and/or perform power monitoring.

In block 235, the host processor is capable of writing the command generated in block 230 to the command queue of the scheduler. For example, the host processor is capable of writing the command via the communication link to a slot in the command queue having the address computed in block 225. As such, the command is effectively pushed onto the command queue. As long as the command queue has available slots, the host processor may continue to store command within the slots.

In block 240, in the case where there are no further workgroups to process, the host processor is capable of checking whether the workgroups associated with the kernel event have finished execution. The scheduler is capable of notifying the host processor that a command has finished execution by writing a value of "1" to the bit location in the status register that corresponds to the slot of the command queue that stores the command that finished execution.

In one or more embodiments, the host processor is capable of polling the status register (e.g., reading the status register periodically). In one or more other embodiments, the scheduler is capable of generating an interrupt to the host processor indicating that the status register has been written and that the host processor should read the status register.

In any case, in block 240, the host processor is capable of reading the status register to determine whether the commands for the workgroups for the kernel event have finished executing. If the host processor determines that the workgroups have not completed execution, method 200 may loop back to block 205 to continue processing. If the host processor determines that the workgroups have completed execution, method 200 may continue to block 245. In block 245, the host processor is capable of marking the kernel event as being complete.

In one or more embodiments, each time the host processor reads the status register, the host processor is capable of storing the status of the slots that are free and the commands that have completed. In this regard, FIG. 2 is provided for purposes of illustration. The particular order of the operations described may vary since the host processor is capable of storing the status of the slots. A slot of the command queue cannot be reused to store a further command until the command that last occupied the slot has been processed or executed.

Figure 3:
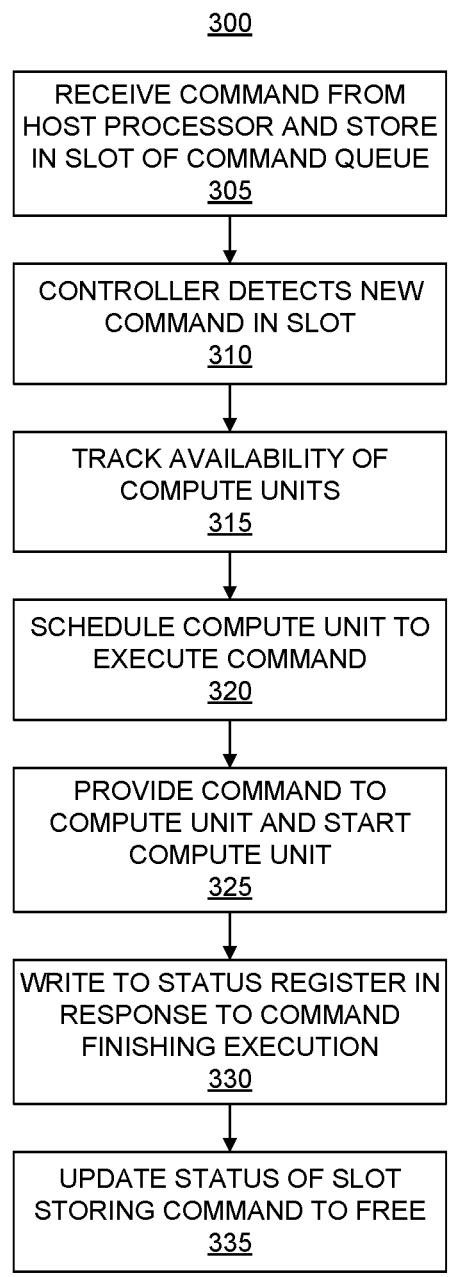
FIG. 3 illustrates a method of processing commands from the host processor as performed by the scheduler.

FIG. 3 illustrates a method 300 of processing commands from the host processor as performed by scheduler 160 described in connection with FIG. 1. Method 300 is a simplified version of the operations that may be performed by the scheduler to process commands from the host processor. For example, FIG. 3 does not illustrate each of the different statuses of slots in the command queue that may be used as described in greater detail with reference to FIG. 4.

Method 300 may begin in a state where the host processor has sent a command to IC 150. In block 305, a command is received from the host processor and is stored in the slot of the command queue. For example, the interface within the IC is capable of receiving the command from the host processor over the communication link. The interface stores the command at the address of the command queue specified by the host processor. As discussed, the host processor is capable of determining which of the slots of the command queue are free and initiating a write of the command to the address of the free slot.

In block 310, the controller of the scheduler is capable of detecting the new command. In one or more embodiments, the controller is capable of checking each of the slots in the command queue and detecting any new commands from the host processor as written. In particular embodiments, slots of the command queue may exist in any of four different states. For example, slots may be free, new, queued, or running. When the controller detects a new command in a slot, the controller is capable of reading the header of the command from the command queue and caching the header locally within the controller. When the controller changes the status of the slot (e.g., and/or the command stored in the slot), the controller is capable of updating the locally cached header as opposed to the header stored in the command queue in order to reduce processing time.

In block 315, the controller is capable of tracking the availability of the compute units within the IC. For example, the controller is capable of determining whether the compute units are busy or idle. In block 320, the controller is capable of scheduling a compute unit that is available, e.g., idle, to execute the command stored in the command queue. In one or more embodiments, the scheduled compute unit is one that is idle and also one that is allowed to execute the command per the bit mask included within the header of the command. In block 325, the controller is capable of providing the command to the compute unit and starting the compute unit. In block 325, for example, the controller provides the arguments of the command to the compute unit and starts the compute unit.

In block 330, in response to the controller determining that the compute unit has finished execution of the command, the controller is capable of writing a value of "1" to the bit location in the status register corresponding to the slot of the command queue from which the command that finished executing was read. For example, if the command that finished executing was stored in slot 3 of the command queue, the controller writes a value of "1" to the bit position in the status register corresponding to slot 3 of the command queue. In block 335, the controller is capable of updating the status of the slot to free. As noted, the controller may update the status of the slot by updating the locally cached copy of the header of the command.

Figure 4:
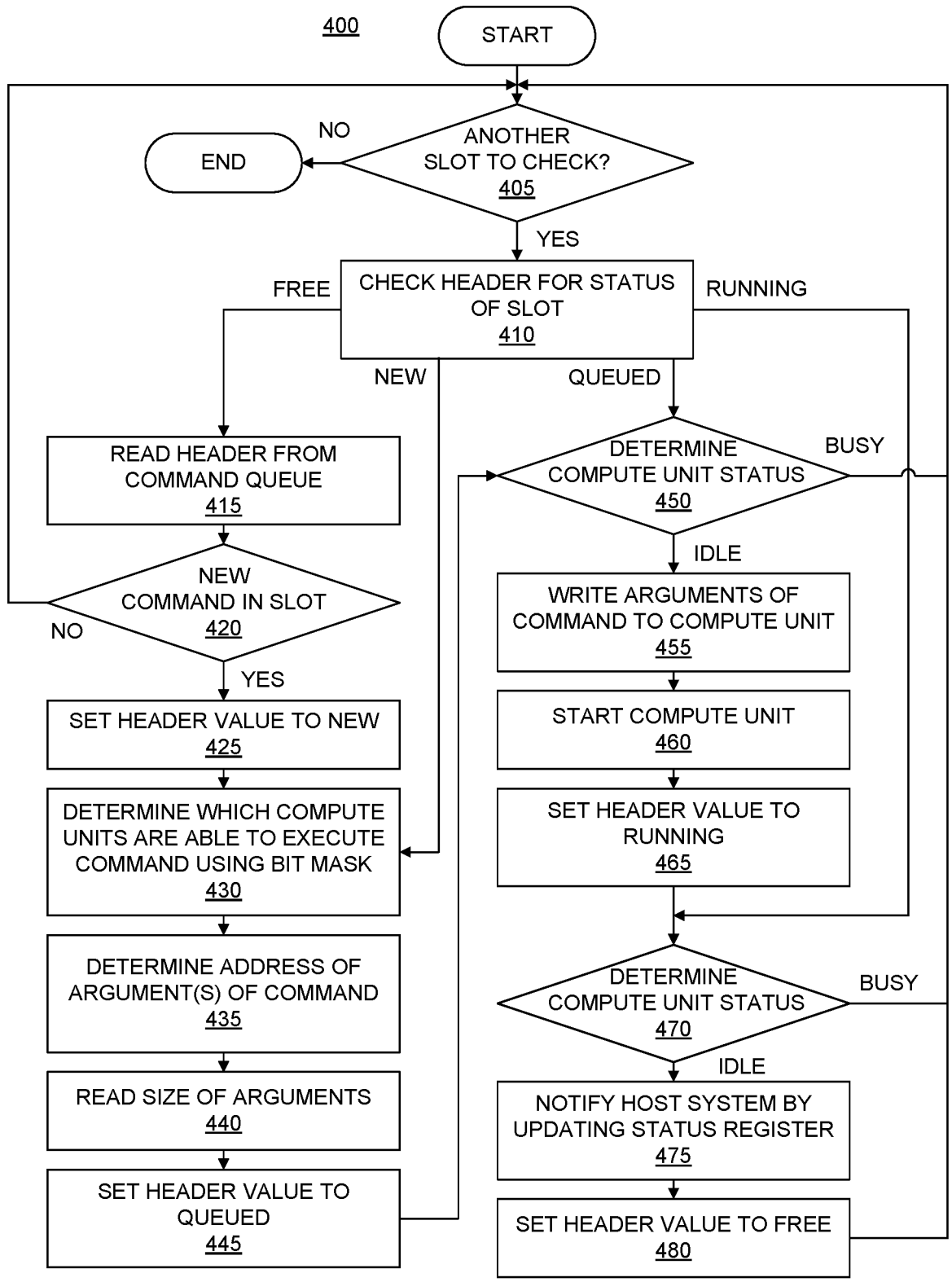
FIG. 4 illustrates another example method of processing commands from the host processor as performed by the scheduler.

FIG. 4 illustrates another example method 400 of processing commands from the host processor as performed by scheduler 160 described in connection with FIG. 1. Method 400 illustrates a more detailed version of the operations that may be performed by the scheduler to process commands from the host processor. Method 400 illustrates an example where the controller is capable of looping through the slots of the command queue. Method 400 further illustrates how the controller tracks the slots of the command queue and updates the statuses of the slots accordingly.

In block 405, the controller is capable of determining whether there are any further slots to process. In response to determining that one or more slots remain to be processed, method 400 continues to block 410. Otherwise, method 400 may end. It should be appreciated that method 400 may be started anew by the controller to process slots of the command queue periodically or in response to particular events.

In block 410, the controller is capable of checking the status of the header for the slot, e.g., a currently selected slot. The controller, for example, is capable of reading a value stored in the cached header for the slot. The value checked by the controller indicates the status of the slot as being free, new, queued, or running.

In response to the value indicating that the slot is free, method 400 continues to block 415. In block 415, the controller is capable of reading the header for the slot directly from the command queue. As discussed, in reading the header, the controller is capable of storing a new locally cached copy of the header for the slot. In block 420, the controller determines whether a new command has been received in the slot. In one example, the controller is capable of comparing the newly cached header with the prior cached header to determine whether a new command has been stored in the slot.

In response to determining that a new command is stored in the slot of the command queue, method 400 continues to block 425. In response to determining that the slot does not store new command, method 400 loops back to block 405 to continue processing further slots. In block 425, the controller is capable of setting the value in the locally cached copy of the header to indicate that the slot is new.

Method 400 may continue to block 430 from block 425 or from block 410 in the case where the controller determines that the status of the slot (in block 410) is new. In block 430, the controller determines which of the compute units of the IC may be used to execute the command. For example, the header of the command cached within the controller may include one or more bits indicating which compute units may be used to execute the command. The controller is capable of reading these bits to determine which of the compute units (e.g., particular compute units and the number of compute units) are able (e.g., allowed) to execute the command.

In one or more embodiments, the compute units that may be used by a command may be encoded as a bit mask within the header of the command. The bit mask may include bits in positions that correspond to a compute unit index maintained by the controller (e.g., where each compute unit may be identified by a corresponding compute unit index). In one or more embodiments, compute unit addresses may be non-consecutive and separated by arbitrary address ranges. As such, the controller may be configured with a lookup table that maps a compute unit index to the address for the compute unit. The controller is capable of determining the address of a compute unit specified by the bit mask by using the lookup table to map the compute unit index to the address for the compute unit identified by the compute unit index.

In one or more other embodiments, compute unit addresses may be consecutive and may be separated by fixed address ranges. In that case, the controller is capable of determining the address of each of the compute units that may be used to execute the command based upon the bit mask read from the header of the command. In particular embodiments, the fixed address range may be 4 k. In that case, the controller may determine the compute unit address by shifting the index by 12 (4 k) bits to the left.

In block 435, the controller determines the address of the argument(s) of the command. In particular embodiments, each compute unit has a register map (e.g., register map interface) to which arguments may be written. The register map of the compute unit may have a one-to-one correspondence with the register map portion of a command stored in the payload of a command. In block 435, the controller is capable of determining the address of the register map of the command by offsetting into the command queue to the location of the register map in the payload of the command.

In block 440, the controller is capable of reading the size of the arguments of the command. In block 445, the controller is capable of setting the header value to indicate that the slot is queued. As discussed, the controller is capable of updating the header value within the locally cached copy of the header and leaving the header within the slot of the actual command queue undisturbed.

Method 400 may continue to block 450 from block 445 or from block 410 in the case where the controller determines (in block 410) that the status of the slot is queued. The queued status of the slot means that the slot includes a command that is ready to be performed by a compute unit. Accordingly, in block 450, the controller is capable of determining the status of the compute unit(s) that may be used to execute the command per the bit mask. In response to determining that the compute unit(s) specified by the bit mask is/are busy, method 400 loops back to block 405 to process on another slot of the command queue since the command within the current slot may not be offloaded to a compute unit. In response to determining that one or more of the compute unit(s) is idle, method 400 continues to block 455.

In block 455, the controller writes the arguments of the command of the slot currently being processed to a compute unit determined in block 450. In one or more embodiments, the controller selects the first available compute unit of those determined in block 450. For example, the controller is capable of performing a memory copy to transfer the argument(s) from the register map (e.g., payload) of the command in the command queue to the register map of the selected compute unit. The controller, for example, may copy the contents of the register map of the command to the compute unit by writing to the address of the compute unit (e.g., the base address for the register map of the compute unit determined as described with reference to block 430).

In block 460, after having written the arguments of the command to the compute unit, the controller is capable of starting the compute unit. In block 465, the controller is capable of setting the value within the locally cached copy of the header of the command to indicate a status of running. The running status indicates that the command is currently being executed by one or more compute units.

Method 400 may continue to block 470 from block 465 or from block 410 in the case where the controller determines (in block 410) that the status of the slot is running. FIG. 4 illustrates an example implementation where the controller is configured to poll the compute units to determine whether each compute unit is in a busy state or in idle state. Accordingly, in block 470, the controller determines the status of the compute unit. The controller, for example, polls the compute unit to determine whether the compute unit is busy or idle. In response, the compute unit may provide a signal indicating the current status as busy or idle.

In response to determining that the compute unit is busy, method 400 loops back to block 405 to check the status of the next slot of the command queue. In response to determining that the compute unit is idle, the controller is capable of notifying the host processor by updating the status register. The controller, for example, may write the value of "1" to the bit position of the status register corresponding to the slot that includes the command that was executed by the compute unit. In block 480, the controller sets the header value to indicate the status of free. As discussed, the controller is capable of updating the header value within the locally cached copy of the header of the command as opposed to the header within the actual command queue.

Figure 5:
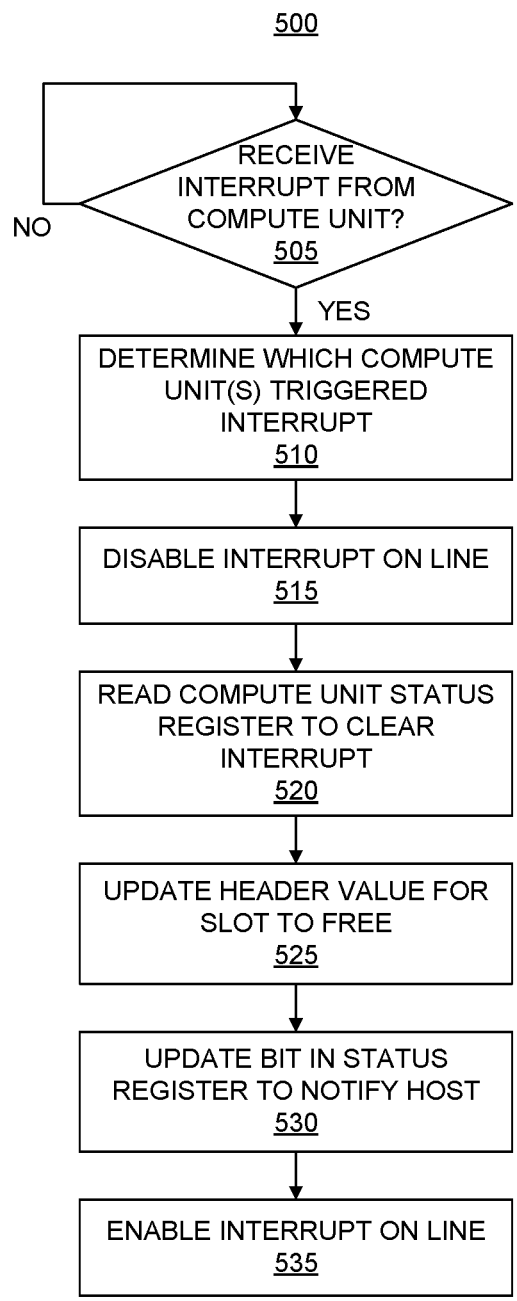
FIG. 5 illustrates an example method of determining the status of compute units.

FIG. 5 illustrates an example method 500 of determining the status of compute units. In one or more embodiments, compute units may be configured to generate interrupts to indicate a change in status. In such cases, the controller need not poll compute units to determine status. FIG. 5 illustrates operations that may be performed by the controller in embodiments where the compute units are configured to generate such interrupts. Method 500 of FIG. 5, for example, may be used in place of blocks 470, 475, and 480 in the example of FIG. 4 in embodiments where the compute units are configured to generate interrupts and the controller does not poll the compute units for status.

In block 505, the controller determines whether an interrupt from a compute unit has been received. The interrupts generated by the compute units, for example, may indicate that the compute unit has completed operation and has entered an idle state. In response to determining that an interrupt has not been received from a compute unit, method 500 may loop back to block 505 to continue checking for a received interrupt from a compute unit. In response to determining that an interrupt from a compute unit has been received, method 500 may continue to block 510.

In block 510, the controller determines which compute unit triggered the interrupt. In one or more embodiments, the controller is capable of executing an interrupt handler routine that receives a bit mask with a bit set for each compute unit that has completed operation. As such, the interrupt handler routine is capable of processing each of the compute units specified in the bit mask in one call. While method 500 may process interrupts from more than one compute unit, for purposes of illustration, the handling of a single interrupt from a compute unit is described.

In block 515, the controller is capable of disabling the interrupt on the particular line through which the interrupt was detected in block 505. In block 520, the controller is capable of clearing a status register in the compute unit that generated the interrupt to clear the interrupt. In block 525, the controller is capable of updating the header value within the locally cached copy of the header of the command executed by the compute unit to indicate that the slot of the command queue storing the command executed by the compute unit is now free.

In block 530, the controller is capable of updating the appropriate bit within the status register to indicate that the command stored in the corresponding slot of the command queue has finished execution. As discussed, writing to the status register allows the scheduler to notify the host system that a command has completed execution. In block 535, the controller is capable of enabling interrupts on the line corresponding to the compute unit.

This disclosure describes embodiments in which compute units are capable of generating interrupts to notify the scheduler that execution has completed (interrupt mode) and embodiments in which the scheduler is capable of polling compute units determine whether execution is finished (polling mode). In some cases, compute unit polling may be implemented by the scheduler. In other cases the compute units may be configured to generate interrupts as described. When using the interrupt mode, a thread executed by the host processor to poll compute units may be configured to run as a pure scheduling thread that only runs when the command queue has room to store new commands.

In still other cases, both polling and compute unit generated interrupts may be used in combination. For example, interrupt handling may provide improved performance over polling when multiple kernels are running at the same time. In polling mode, the compute unit status register must be read for each of the running commands. In interrupt mode, the compute unit status register is not read unless the compute unit has interrupted the scheduler to announce completed execution. As such, in cases where a limited number of compute units are running, the polling mode may be faster than the interrupt mode. As the number of compute units that are running exceeds a threshold number, the embodiments may transition to the interrupt mode. The embodiments may transition between the polling mode and the interrupt mode based upon the number of compute units executing compared to the threshold number of compute units.

In accordance with the inventive arrangements described herein, the scheduler is capable of scheduling workgroups onto any of the compute units specified in the command. The scheduler may schedule as many workgroups as possible on idle compute units and wait for the compute units to be idle again before scheduling further workgroups.

In particular embodiments, in cases where the command queue is full, the host processor may wait for a notification that the command queue has room for more commands. The notification may be implemented by the host processor polling the scheduler or by the scheduler, (e.g., the controller) generating an interrupt to the processor indicating available space within the command queue.

Figure 6:
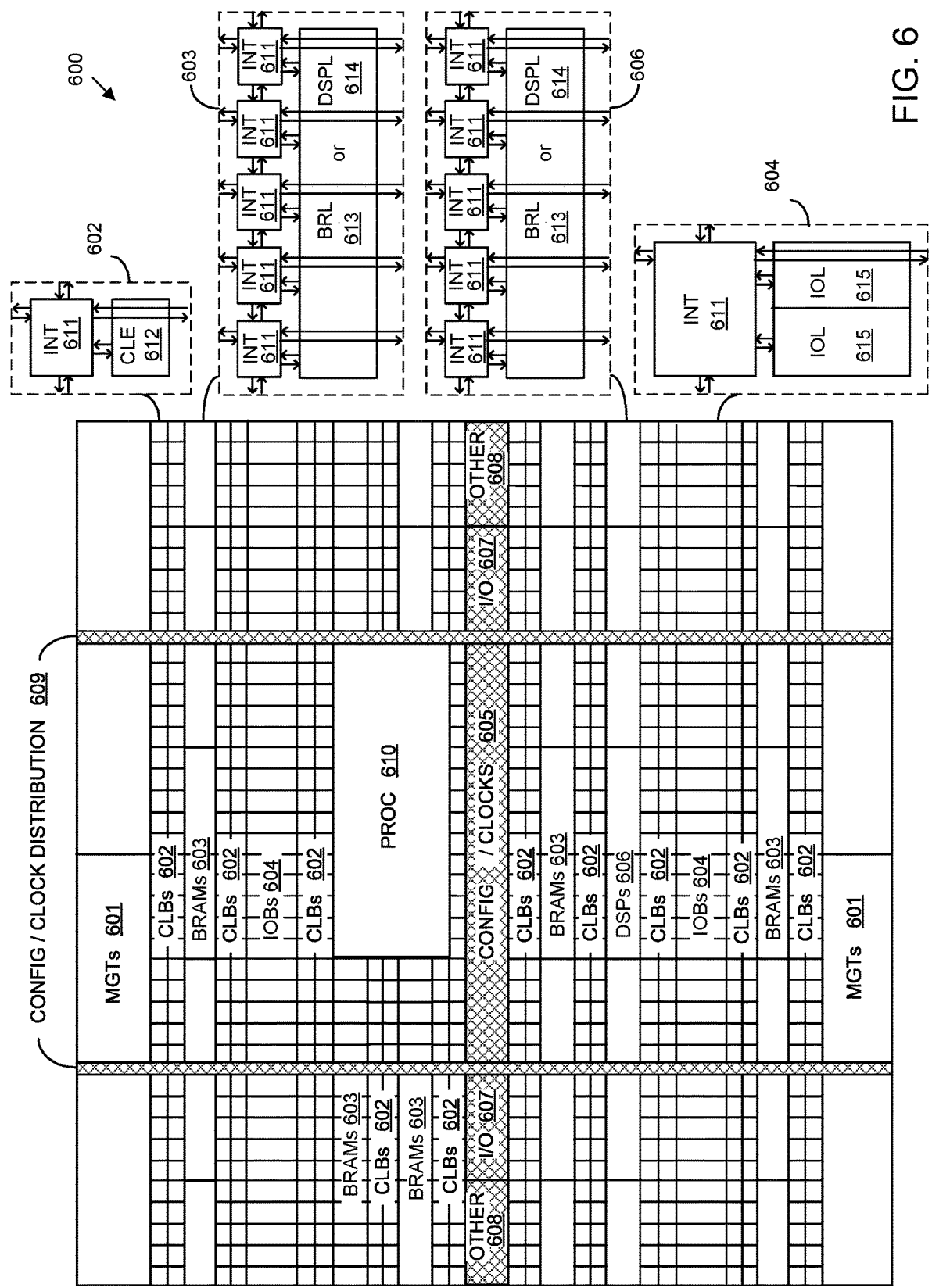
FIG. 6 illustrates an example architecture for an integrated circuit (IC).

FIG. 6 illustrates an example architecture 600 for an IC. In one aspect, architecture 600 may be implemented within a programmable IC. For example, architecture 600 may be used to implement an FPGA. Architecture 600 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random-access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the top of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a columnar area near the center of the die, e.g., formed of regions 605, 607, and 608, may be used for configuration, clock, and other control logic. Horizontal areas 609 extending from this column may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

Scheduler 160 may be implemented using an IC having an architecture as described in connection with FIG. 6. For example, BRAMs may be used to implement the command queue. PROC 610 may be used to implement controller 175. Registers within programmable circuitry of the IC may be used to implement status register 170. Programmable circuitry may be used to implement interface 155 and compute units 180. In particular embodiments, memory controller 185 is hardwired. In other embodiments, memory controller 185 is also implemented using programmable circuitry.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to an integrated circuit (IC) that includes a scheduler for hardware acceleration. The scheduler may include a command queue having a plurality of slots and configured to store commands offloaded from a host processor for execution by compute units of the IC. The scheduler may include a status register having bit locations corresponding to the slots of the command queue. The scheduler may also include a controller coupled to the command queue and the status register. The controller may be configured to schedule the compute units of the IC to execute the commands stored in the slots of the command queue and update the bit locations of the status register to indicate which commands from the command queue are finished executing.

In an aspect, the status register may be configured to clear contents stored therein in response to being read.

In another aspect, the scheduler may include an interface configured to communicate over a communication link with the host processor and store the commands within available slots of the command queue.

In another aspect, the commands stored in the command queue may include arguments used by the compute units to execute the respective commands.

In another aspect, each command may specify which of the compute units is allowed to execute the command.

In another aspect, the controller may be configured to assign commands to compute units based upon which of the compute units is idle and allowed to execute each respective command.

In another aspect, the controller may be a processor configured to execute program code. The processor may be a soft processor implemented using programmable circuitry of the IC.

In another aspect, the controller may be configured to determine that a selected compute unit on which a selected command is able to run is idle, transfer arguments of the selected command to the selected compute unit for execution, and start the selected compute unit.

In another aspect, the controller may be configured to, in response to determining that the selected command is finished executing, write to the bit location in the status register corresponding to the slot including the selected command indicating that the slot is free.

One or more embodiments are directed to a method of scheduling commands for hardware acceleration using an IC. The method may include storing a command, received from a host processor, within a slot of a command queue within the IC, wherein the command is offloaded from the host processor for execution by a compute unit of the IC. The method may include scheduling, using a controller, the compute unit to execute the command stored in the slot of the command queue. The method may include, in response to determining that the command is finished executing, writing a bit location in a status register within the IC, wherein the bit location corresponds to the slot of the command queue storing the command.

In an aspect, the method may include maintaining, within the controller, locally cached copies of headers of commands stored in slots of the command queue and updating status of slots by updating values in the locally cached copies of the headers.

In another aspect, the method may include clearing contents stored in the status register in response to the status register being read.

In another aspect, the commands stored in the command queue may include arguments used by the compute units to execute the command.

In another aspect, the method may include determining, from each command, which of the compute units is allowed to execute the command.

In another aspect, the method may include assigning commands to the compute units based upon which of the compute units is idle and allowed to execute each respective command.

In another aspect, the method may include determining that a selected compute unit on which a selected command is able to run is idle, transferring arguments of the selected command to the selected compute unit for execution, and starting the selected compute unit.

In another aspect, the writing of the bit location may indicate that the slot is free.

In another aspect, the method may include determining that the selected compute unit is finished executing the selected command by receiving an interrupt from the selected compute unit.

In another aspect, the method may include determining that the selected compute unit is finished executing the selected command by polling the selected compute unit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit comprising:
   a plurality of compute units configured to perform operations offloaded by a host processor;
   a scheduler for hardware acceleration, the scheduler comprising:
      a command queue having a plurality of slots and configured to store commands offloaded from the host processor for execution by the plurality of compute units;
      a status register having bit locations corresponding to the slots of the command queue;
      a controller coupled to the command queue and the status register, wherein the controller is configured to schedule the plurality of compute units of the integrated circuit to execute the commands stored in the slots of the command queue and update the bit locations of the status register to indicate which commands from the command queue are finished executing;
   wherein each command includes a header having a bit mask specifying each of the plurality of compute units that can execute the respective command; and
   wherein the controller is configured to cache a local copy of the header and determine a selected compute unit from one or more of the plurality of compute units capable of executing a selected command based on the bit mask of the selected command read from the local copy of the header, determine that the selected compute unit is idle, transfer arguments of the selected command to the selected compute unit for execution, and start the selected compute unit.

2. The integrated circuit of claim 1, wherein the status register is configured to clear contents stored therein in response to being read.

3. The integrated circuit of claim 1, wherein the scheduler further comprises:
   an interface configured to communicate over a communication link with the host processor and store the commands within available slots of the command queue.

4. The integrated circuit of claim 1, wherein the commands stored in the command queue include arguments used by the plurality of compute units to execute the respective commands.

5. The integrated circuit of claim 1, wherein the controller is configured to update a value within the local copy of the header to indicate a current status of the command and, in response to the current status indicating free, the controller updates the slot corresponding to the command.

6. The integrated circuit of claim 1, wherein the controller is a processor configured to execute program code.

7. The integrated circuit of claim 6, wherein the processor is a soft processor implemented using programmable circuitry of the integrated circuit.

8. The integrated circuit of claim 1, wherein the controller is configured to, in response to determining that the selected command is finished executing, write to the bit location in the status register corresponding to the slot including the selected command indicating that the slot is free.

9. A method of scheduling commands for hardware acceleration, the method comprising:
   storing a command, received from a host processor, within a slot of a command queue implemented within an integrated circuit, wherein the command is offloaded from the host processor for execution by a compute unit selected from a plurality of compute units implemented within the integrated circuit;
   caching, within a controller implemented in the integrated circuit and coupled to the command queue, a local copy of a header of the command, wherein the header includes a bit mask indicating a subset of one or more of the plurality of compute units capable of executing the command;
   selecting the compute unit by determining that the compute unit is within the subset of one or more of the plurality of compute units capable of executing the command based on determining that the compute unit is idle and the bit mask read from the local copy of the header;
   scheduling, using the controller implemented in the integrated circuit, the compute unit to execute the command stored in the slot of the command queue; and
   in response to determining that the command is finished executing, writing a bit location in a status register implemented within the integrated circuit, wherein the bit location corresponds to the slot of the command queue storing the command.

10. The method of claim 9, further comprising:
   using the controller, updating a value within the local copy of the header to indicate a current status of the command and, in response to the current status indicating free, the controller updating the slot corresponding to the command.

11. The method of claim 9, further comprising:
   clearing contents stored in the status register in response to the status register being read.

12. The method of claim 9, wherein the command stored in the command queue includes arguments used by the compute unit to execute the command.

13. The method of claim 9, further comprising:
   transferring arguments of the command to the compute unit for execution; and
   starting the compute unit.

14. The method of claim 13, wherein the writing the bit location indicates that the slot is free.

15. The method of claim 13, further comprising:
   determining that the compute unit is finished executing the command by receiving an interrupt from the compute unit.

16. The method of claim 13, further comprising:
   determining that the compute unit is finished executing the command by polling the compute unit.

* * * * *